United States Patent [19]
d'Alayer de Costemore d'Arc

[11] Patent Number: 4,527,265
[45] Date of Patent: Jul. 2, 1985

[54] POSITION MEMORY FOR LASER REPRODUCTION UNIT

[75] Inventor: Stéphane A. M. d'Alayer de Costemore d'Arc, Ways, Belgium

[73] Assignee: Staar S. A., Brussels, Belgium

[21] Appl. No.: 608,878

[22] Filed: May 10, 1984

[30] Foreign Application Priority Data

Jun. 30, 1983 [BE] Belgium .................. 211088

[51] Int. Cl.³ ........................... G11B 17/00
[52] U.S. Cl. ...................... 369/244; 369/79;
369/215; 369/233; 369/292
[58] Field of Search ............ 369/34, 41, 215, 230,
369/233, 244, 251, 252, 257, 79, 292

[56]  References Cited
U.S. PATENT DOCUMENTS 3,281,152 10/1966 Narutani ...................... 369/244
4,260,162  4/1981 Morii et al. .................. 369/215
4,403,316  9/1983 Veerdonk ..................... 369/244
4,455,641  6/1984 Sliski ........................ 369/244
4,460,991  7/1984 Omoto ........................ 369/230

Primary Examiner—Steven L. Stephan
Attorney, Agent, or Firm—Leydig, Voit, Osann, Mayer and Holt, Ltd.

[57] ABSTRACT

A record player apparatus with a laser reproduction unit and a movable support for moving the reproduction unit across the surface of a record as the record is rotated during a playing operation to position the reproduction unit to reproduce recordings in tracks on the records has a non-volatile memory unit for storing identification information read by the reproduction unit from tracks on the records which retains the information when the power supply is cut off and the reproducing is interrupted while the record is being rotated during a playing operation and has a mechanism for locating the reproduction unit in the position occupied when the power supply was cut off to resume the reproducing at the point of interruption when the power supply is reconnected.

9 Claims, 5 Drawing Figures

POSITION MEMORY FOR LASER REPRODUCTION UNIT

TECHNICAL FIELD

The present invention relates to record player apparatus and, more particularly, to record player apparatus for mounting in vehicles and especially concerns record player apparatus with an optical reproduction unit employing a laser for reproducing sound recordings on compact disc (CD) records.

BACKGROUND ART

When a record is played in such apparatus and the operation of the vehicle is interrupted, the apparatus is switched off so that when it is next used the reproduction of the sound recordings carried by the record begins at the very beginning of the record.

This mode of operation is particularly undesirable because, with cassette players and other kinds of tape player apparatus, the user is accustomed to the reproduction of the sound resuming very precisely at the point where it was interrupted.

DISCLOSURE OF INVENTION

The principal object of the present invention is to overcome this disadvantage for a record player apparatus with a laser reproduction unit to enable the reproduction to be resumed at the point where it was interrupted with an inexpensive and reliable device of simple design.

With a view to achieving this object, the invention is disclosed in alternative embodiments, first being embodied in a combined mechanical and electronic device and alternatively embodied in an entirely electronic device associated with the record player apparatus and including a memory for storing identification information relating to a record (e.g., coding of the different pieces, titles, speed of rotation) which is retained after the power supply is cut off and a device for locating the laser reproduction unit in the position occupied when the power supply was cut off so long as the record is not withdrawn, either manually or automatically, to resume the reproducing of the sound recordings at the point of interruption when the power supply is reconnected.

BRIEF DESCRIPTION OF THE DRAWINGS

Further objects will become apparent as the description proceeds with reference to the drawings, in which.

BEST MODES FOR CARRYING OUT THE INVENTION

Figure 1:
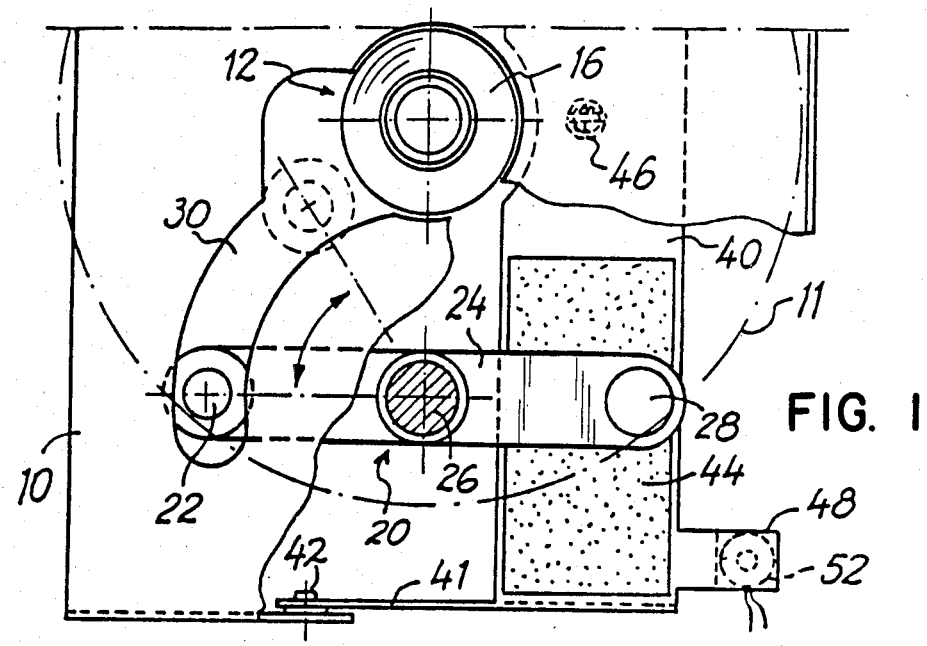
FIG. 1 is a partial plan view of a record player apparatus having a combined mechanical and electronic embodiment of the present invention associated with a laser reproduction unit.
Figure 2:
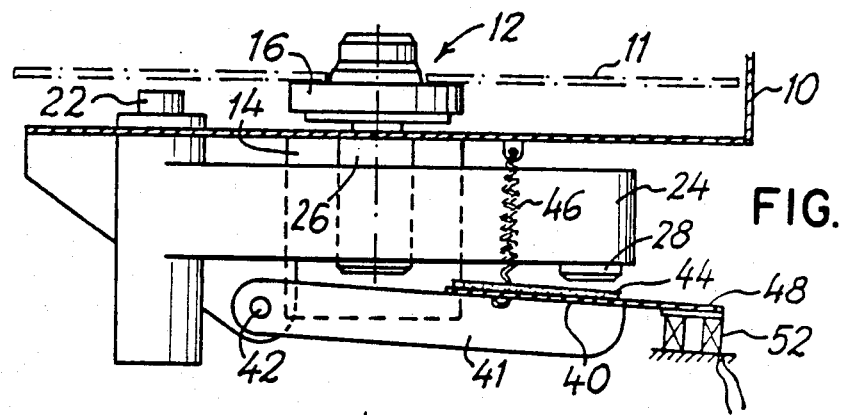
FIG. 2 is a side view of the record player apparatus in a first embodiment of the invention shown in FIG. 1 showing the laser reproduction unit in its enabled operating position.
Figure 3:
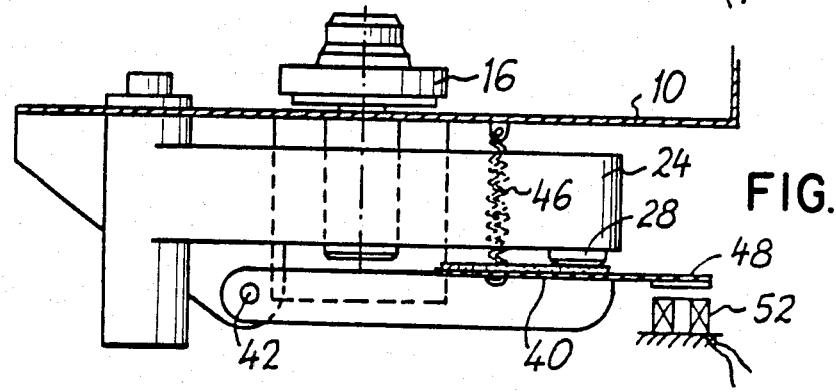
FIG. 3 is a side view of the same record player apparatus showing the laser reproduction unit disabled by the first embodiment of the invention.

Referring to FIGS. 1-3, there is shown a chassis 10 of a record player apparatus on which is mounted drive means 12 for a record 11, including a motor 14 equipped with a drive plate 16 on which the record is clamped. A reproduction unit 20 employs a laser 22 movable outwardly across the surface of the record from the innermost portion of the recording track to over the outermost portion. The laser 22 is mounted at one end of a lever 24 which is pivotable about a spindle 26 fixed to the chassis 10.

At the opposite end of the lever 24 from the laser 22, a counterweight 28 is fixed to the lever 24.

In accordance with a first embodiment of the present invention, a combined mechanical and electronic device is shown having an electronic memory 75 (FIG. 4) for storing identification information relating to the record. This embodiment also includes identification means for locating the reproduction unit 20 in the position occupied when the power supply was cut off, when the power supply is reconnected, herein shown as a mechanical device for locking the reproduction unit 20 in position and against further movement when the apparatus is switched off while the record in being played.

With regard to the storage of identification information about the record, such information is recorded on the record at the innermost portion of the recording track and includes, e.g., the total number of recorded pieces carried by the record, titles, speed range of rotation, and other items.

When a record is introduced into the apparatus, a switch 86 (FIG. 4) actuated in response to loading the record in the operating position by the loading mechanism 85, which may be of the type disclosed in U.S. application Ser. No. 454,240, filed Dec. 29, 1982, actuates the reproduction unit 20 to read the recorded information and transfer the data read to the memory 75, which is preferably a conventional, non-volatile memory of the erasable type known as an EEPROM. In such a memory, the information is retained after cut off of the power supply. When the record is shifted to an unloaded position, the switch 86 is actuated by the mechanism 85 and an erase function executed by the microprocessor 70 to erase the data stored in the non-volatile memory 75.

For locking the reproduction unit 20 in position, means are provided, herein shown as a pivotable plate 40 equipped with a pad 44 of flexible material, such as, rubber, the plate 40 being supported at one end by an arm 41 which is pivotally supported on a pin 42 carried by the chassis 10.

The plate 40 is preferably urged by a spring 46 upward towards the chassis, the spring 46 being fixed at one end to the chassis 10 and at the other end to the plate 40.

In carrying out the invention, during the operation of the laser reproduction unit 20, the plate 40 is retained in a position spaced from engagement with the laser reproduction unit 20 by means herein shown as an electromagnet 52 fixed to the chassis 10. When the electromagnet 52 is energized, it attracts a tongue 48 projecting from the plate 40 and holds the plate against the electromagnet 52 in the position illustrated in FIG. 2, free and clear of the laser reproduction unit 20.

In the operation of the first embodiment of the invention, when a record is inserted into the apparatus, the switch 86 (FIG. 4) is closed, causing the electromagnet 52 to be energized to attract the plate 40 against the action of the spring 46, which allows the record player apparatus to carry out its normal reproduction function using the laser reproduction unit 20.

When the power supply to the record player apparatus is interrupted, the electromagnet 52 is deenergized, which releases the tongue 58 of the plate 40, allowing the plate 40, under the urging of the spring 46, to be raised against the projection 28 associated with the laser reproduction unit 20, causing the unit to be locked in position and disabled at the position occupied at the point of the interruption of the playing of the recording.

Figure 4:
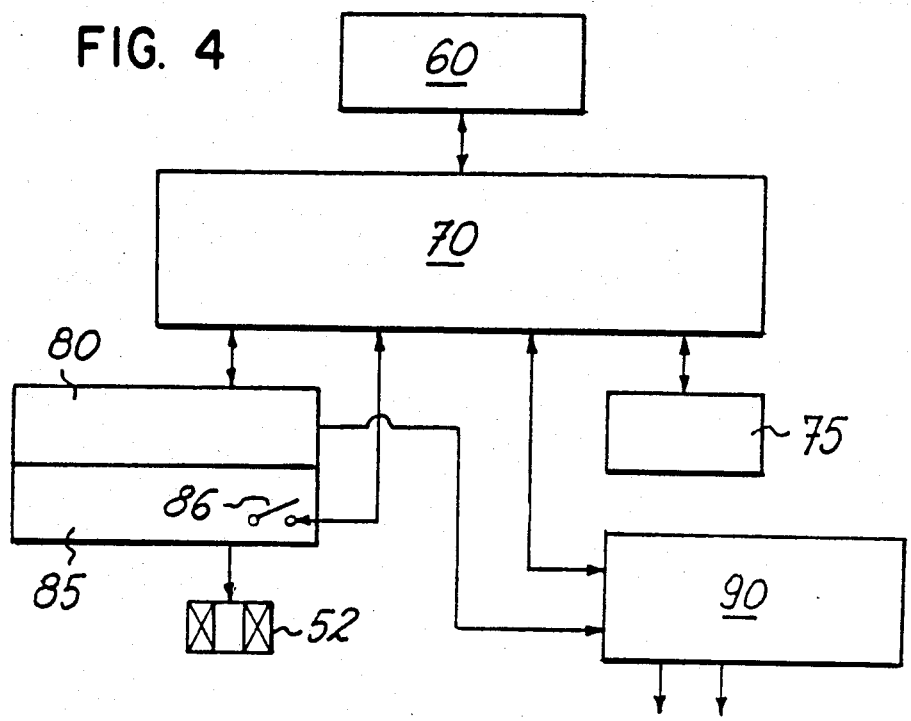
FIG. 4 is a schematic diagram of a circuit forming a part of the first embodiment of the invention shown in FIGS. 1-3.

Referring further to FIG. 4, in addition to the switch 86 and electromagnet 52, in carrying out the invention the mechanical and electronic embodiment herein shown includes a display and keyboard 60 connected to a microprocessor 70 which, under direction of a program, controls the laser reproduction unit 20, the drive motor 14 for rotating the record, and, if desired, various operations of the apparatus, such as the sequence in which different recorded selections are played as directed by the user through the keyboard 60.

In keeping with the invention, a non-volatile memory 75 of the erasable type, such as an EEPROM, is included and is operated by the microprocessor 70 to store data read from the recording on the record using the laser reproduction unit 20 and the circuits associated therewith, all included within the block 90 of the schematic diagram of FIG. 4. Also schematically illustrated in FIG. 4 is the mechanism 85 for loading the record into the operating position and for unloading the record at the direction of the user.

Figure 5:
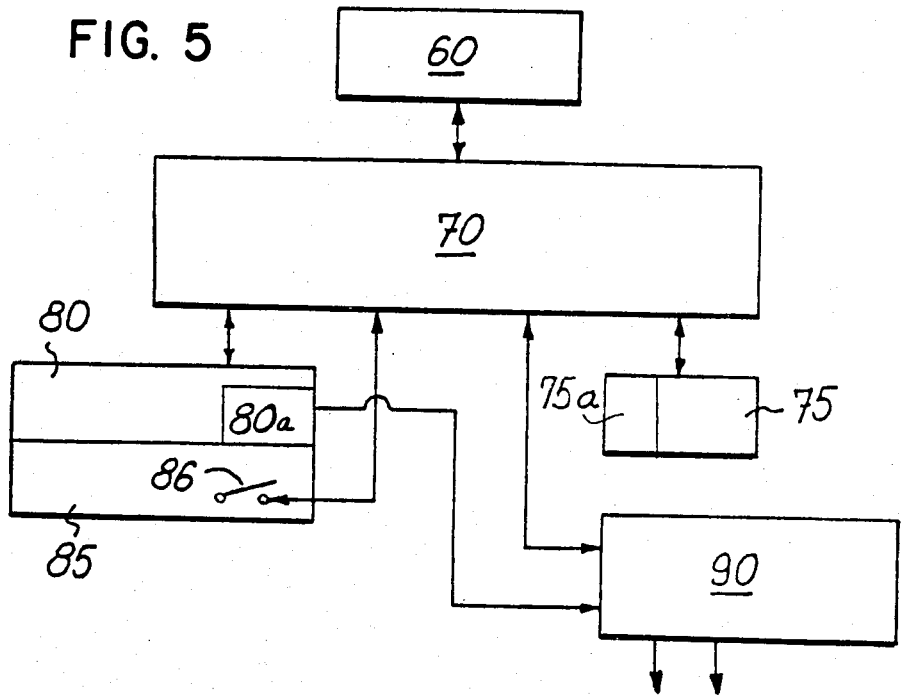
FIG. 5 is a schematic diagram of an entirely electronic embodiment of the invention.

Now turning to FIG. 5, this depicts in a schematic diagram an entirely electronic embodiment of the invention. In accordance with this aspect of the invention, as in the first embodiment, a memory unit 75 is provided for storing identification information recorded on the record. In this embodiment, however, instead of mechanically locking the laser reproduction unit 20, the means for locating the reproduction unit in the position occupied when the power supply is cut off takes the form of a means for determining the location of the reproduction unit at the point of interruption, herein shown as a memory section 75a for storing electronically data representing the precise position of the reproduction unit 20 as it is moved across the record, and a means for positioning the laser reproduction unit at the determined location so that it will resume the reproducing of the same record at the point where it was interrupted.

For this purpose, referring to FIG. 5, using the microprocessor 70 and a non-volatile memory unit 75a, such as an EEPROM, the precise position of the reproduction unit 20 is stored. It is preferable to obtain the position of the laser reproduction unit 20 by reading coding carried on the disc record, conventionally provided on records of the CD type, which is given in terms of time (in minutes and seconds) from the beginning of the record. By use of a table stored in memory, for example, the physical location of the reproduction unit 20 may be determined from the time represented position and the unit shifted to the position represented in memory by a mechanical transducer acting on the lever 24 supporting the unit and moving the lever to locate the laser 22 at the position represented by the data stored in memory.

While it has been indicated that the preferred memory 75 is an EEPROM, it is possible to utilize other forms of non-volatile memory, such as memory of the magnetic bubble type.

I claim:

1. In a record player apparatus having a laser reproduction unit and a movable support for moving said reproduction unit across the surface of a record as the record is rotated during a playing operation to position the reproduction unit to reproduce recordings in tracks on the records, and a switch for controlling the power supply to said apparatus, the improvement comprising:

means including a memory unit for storing identification information read by said reproduction unit from tracks on the record, said memory unit including a non-volatile memory to retain said information when the power supply is cut off by actuation of said switch and the reproducing is interrupted while the record is being rotated during a playing operation; and means for locating the reproduction unit in the position occupied when the power supply was cut off to resume the reproducing at the point of interruption when the power supply is reconnected by actuation of said switch.

2. The record player apparatus according to claim 1 wherein said means for locating the reproduction unit comprises a device for locking the reproduction unit in position and against further movement when the power supply is cut off by actuation of said switch.

3. The record player apparatus according to claim 1 wherein said means for locating the reproduction unit includes means for determining the location of the reproduction unit at the point of interruption based on position information of said reproduction unit derived from data recorded on said record.

4. The record player apparatus according to claim 3 wherein said position information comprises data as to recorded pieces on said record.

5. The record player apparatus according to claim 3 wherein said position information comprises data as to the scanning position of the reproduction unit along the recording tracks.

6. The record player apparatus according to claim 2 wherein said locking device includes a member engagable with said laser unit to mechanically hold the reproduction unit against movement.

7. The record player apparatus according to claim 6 wherein said member is pivotally mounted and resiliently urged into engagement with said reproduction unit and said apparatus includes a control circuit having an electromagnet for retaining said clear of said reproduction unit.

8. In a record player apparatus having a laser reproduction unit and a movable support for moving said reproduction unit across the surface of a record as the record is rotated during a playing operation to position the reproduction unit to reproduce recordings in tracks on the record, and a switch for controllng the power supply to said apparatus, the improvement comprising:

means including a memory unit for storing identification information read by said reproduction unit from tracks on the record, said memory unit includng a non-volatile memory to retain said information when the power supply is cut off by actuation of said switch and the reproducing of a recording is interrupted while the record is being rotated during a playback operation; and means for locating the reproduction unit in the position occupied when the power supply was cut off to resume the reproducing of the recording at the point of interruption when the power supply is reconnected by actuation of said switch comprising a device for locking the reproduction unit in position and against further movement when the power supply is cut off by actuation of said switch.

9. In a record player apparatus having a laser reproduction unit and a movable support for moving said reproduction unit across the surface of a record as the record is rotated during a playing operation to position the reproduction unit to reproduce recordings in tracks on the reocrd, and a switch for controlling the power supply to said apparatus, the improvement comprising:

means including a memory unit for storing identification information read by said reproducing unit from tracks on the record, said memory unit including a non-volatile memory to retain said information when the power supply is cut off by actuation of said switch and the reproducing of a recording is interrupted while the record is being rotated during a playing operation; and means for locating the reproduction unit in the position occupied when the power supply was cut off to resume the reproducing of the recording at the point of interruption when the power supply is reconnected by actuation of said switch including means for determining the location of the reproduction unit at the point of interruption based on position information on said record, and means for positioning the reproduction unit at the determined location.

* * * * *